US006628403B2

(12) United States Patent
Sayers et al.

(10) Patent No.: US 6,628,403 B2
(45) Date of Patent: Sep. 30, 2003

(54) APPARATUS AND METHOD FOR TESTING A TRANSDUCER

(75) Inventors: David C. Sayers, Bremerton, WA (US); Robert M. Blommel, Kingsland, GA (US); Robert E. Kilthau, Bremerton, WA (US); Erik A. Keeney, Poulsbo, WA (US); Nicole F. Rosales, Bremerton, WA (US); Daren C. Davis, Granbury, TX (US)

(73) Assignee: Lockheed Martin Corporation, Dallas, TX (US)

( * ) Notice: Subject to any disclaimer, the term of this patent is extended or adjusted under 35 U.S.C. 154(b) by 3 days.

(21) Appl. No.: 09/881,084

(22) Filed: Jun. 13, 2001

(65) Prior Publication Data

US 2003/0002047 A1 Jan. 2, 2003

(51) Int. Cl.$^7$ ............................................. G01B 11/02
(52) U.S. Cl. ...................................................... 356/498
(58) Field of Search ......................................... 356/498

(56) References Cited

U.S. PATENT DOCUMENTS 5,007,006 A * 4/1991 Taylor et al. ................. 702/97
6,433,875 B1 * 8/2002 Kovac ........................ 356/498

* cited by examiner

*Primary Examiner*—Constantine Hannaher
(74) *Attorney, Agent, or Firm*—Williams, Morgan & Amerson, P.C.

(57) ABSTRACT

An apparatus capable of testing a displacement transducer having an extendable portion includes a slide capable of being moved along an axis and a measuring unit capable of determining a displacement of the slide along the axis. The extendable portion is connectible to the slide so that, when the extendible portion is connected and the slide is moved, the extendable portion is extended and retracted along a path. A method capable of testing a displacement transducer includes determining electrical signal values outputted from the transducer corresponding to displacements of the transducer and creating a statistical model based upon the electrical signal values and the displacements of the transducer. The method further includes determining a displacement error for each of the electrical signal values and the displacements of the transducer based upon the statistical model. Displacement errors that exceed a predetermined tolerance are determined.

45 Claims, 3 Drawing Sheets

APPARATUS AND METHOD FOR TESTING A TRANSDUCER

BACKGROUND OF THE INVENTION

1. Field of the Invention

This invention relates to an apparatus and method capable of testing a transducer and, in one aspect, an apparatus and method capable of determining an amount of error in an outputted signal from a displacement transducer.

2. Description of the Related Art

Generally, a displacement transducer senses a change in a position of a body or a point with respect to a reference point. Linear displacement transducers sense a change in a position of a body or point along a line or axis with respect to a reference point. While different varieties of linear displacement transducers use various techniques to sense a change in position, most have a movable, extendable portion that contacts or is attached to the body to be measured. The extendable portion can be a rod that extends from a transducer body, such as in a linear variable differential transformer (LVDT) or a magnetostrictive displacement transducer. The extendable portion can also be a wire or a cable, such as in a draw-wire transducer with displacements ranging from 0 to 25 meters or more. As the measured body or point changes position, the extendable portion of the transducer changes position, and the transducer outputs a signal corresponding to the degree of change in position. For example, if a displacement transducer has a range of 2500 mm and a designed voltage output of 0–10 volts over its range, a displacement of 250 mm should result in a voltage output of one volt. It follows that a displacement of 500 mm should result in a voltage output of two volts, and so forth.

It is advantageous if the output signal, with respect to the displacement, can be described by a curve. It is even more advantageous if the output signal, with respect to the displacement, has a linear relationship. That is, for a constant change in displacement, there is a constant change in the signal outputted from the transducer. While this is a desirable condition, some degree of error exists. For example, for a displacement of 100 mm, the corresponding signal output might be 1.012 volts; for a displacement of 200 mm, the corresponding signal output might be 2.037 volts. Thus, the outputs of transducers have associated tolerances. For example, a transducer having a displacement range of 1000 mm and a displacement tolerance of +/−0.1% of full scale is capable of determining a displacement within 1.0 mm. That is, in this example, the transducer does not have the ability to discern changes in displacement that are less than 1.0 mm.

Accordingly, it is important that a displacement transducer is capable of operating within the tolerances specified for it. Using a displacement transducer that is incapable of operating within the tolerances specified for it in an application which requires such tolerances can bring on undesirable results.

The present invention is directed to overcoming, or at least reducing the effects of, one or more of the problems set forth above.

SUMMARY OF THE INVENTION

In one aspect of the present invention, an apparatus is provided that is capable of testing a displacement transducer having an extendable portion. The apparatus includes a slide that is capable of being moved along an axis. The extendable portion of the displacement transducer is connectible to the slide so that, when the extendable portion is connected to the slide and the slide is moved, the extendable portion is extended and retracted along a path. In applications wherein the extendable portion of the transducer is longer than the slide, a displacement transducer of any length can be measured by clamping and unclamping the extendable portion and the reciprocating the slide. The apparatus also includes measuring means for determining a displacement of the slide along the axis.

In another aspect of the present invention, a method capable of testing a displacement transducer is provided including determining a plurality of electrical signal values outputted from the transducer corresponding to a plurality of displacements of the transducer and creating a statistical model based upon the plurality of electrical signal values and the plurality of the displacements of the displacement transducer. Further, the method includes determining a displacement error of the displacement transducer for each of the plurality of electrical signal values and the plurality of displacements of displacement transducer based upon the statistical model. Each of the displacement errors is examined to determine which exceed a predetermined tolerance.

BRIEF DESCRIPTION OF THE DRAWINGS

The invention may be understood by reference to the following description taken in conjunction with the accompanying drawings, in which like reference numerals identify like elements, and in which.

Figure 1:
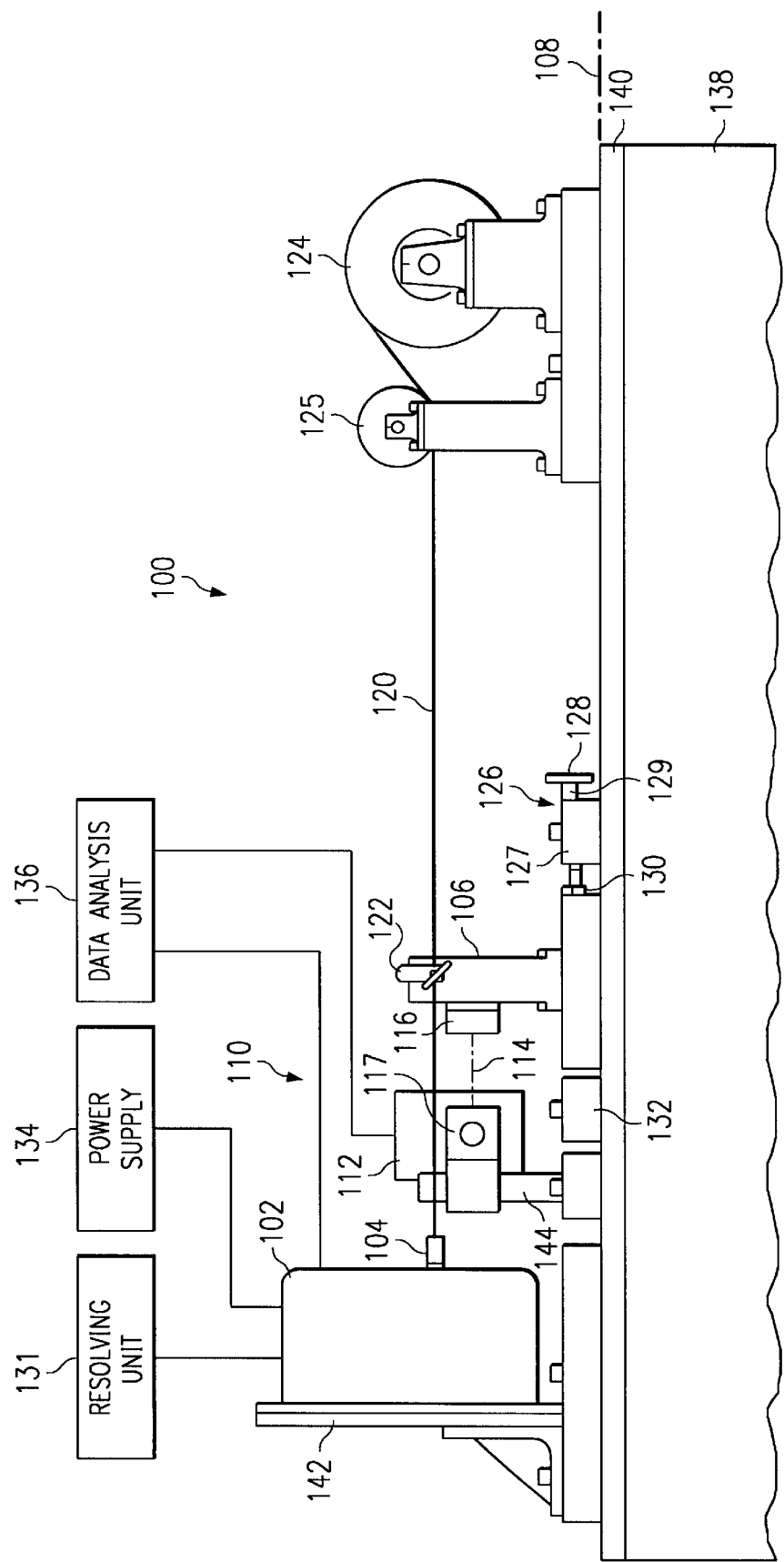
FIG. 1 is a front view of an apparatus according to the present invention, including block diagrams representing certain elements thereof.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

Figure 2:
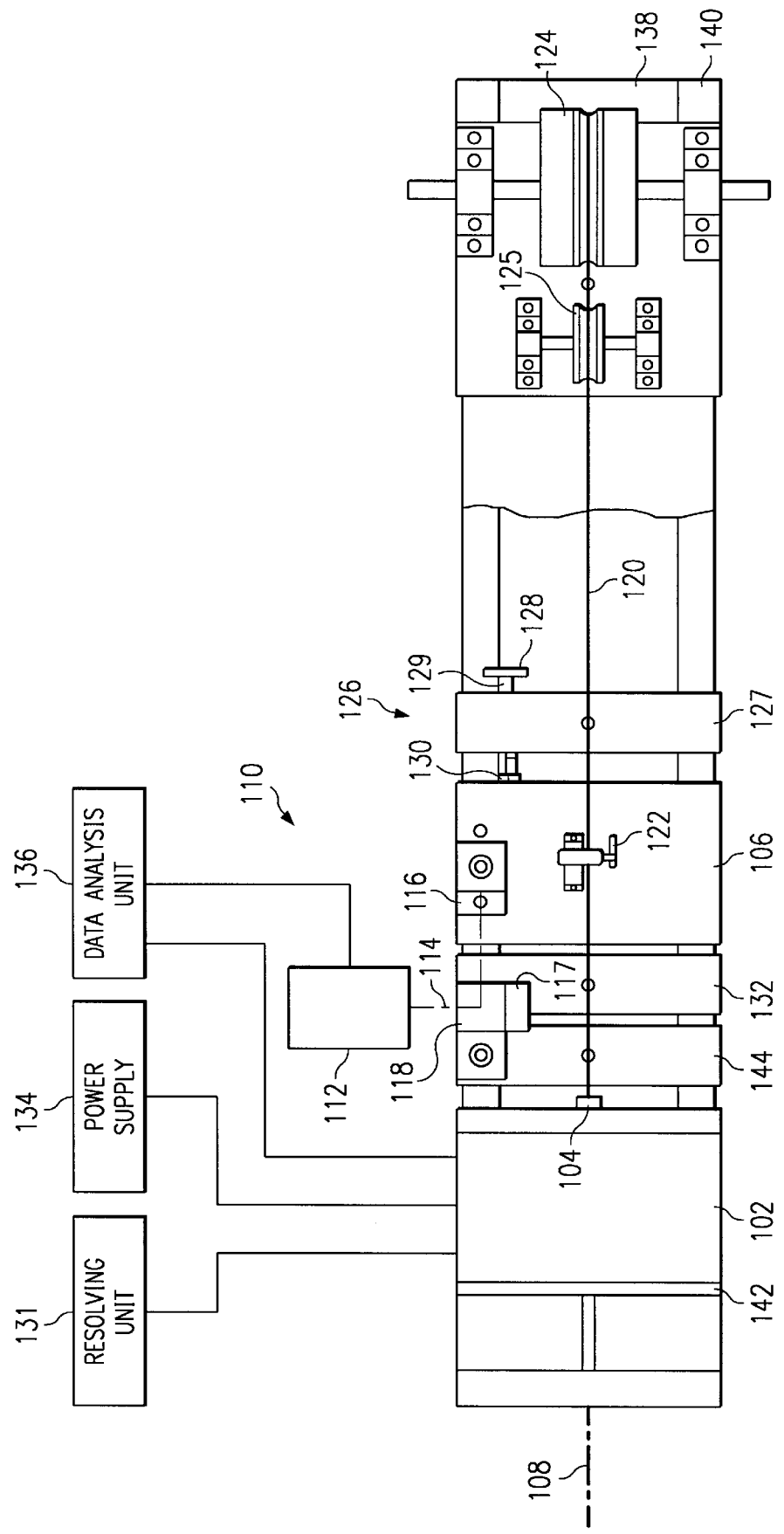
FIG. 2 is a top view of the apparatus in FIG. 1, including block diagrams representing certain elements of the apparatus.

FIGS. 1 and 2 illustrate one embodiment of an apparatus 100 capable of testing a displacement transducer 102 having an extendable portion 104 in accordance with the present invention. The apparatus includes a slide 106 that is capable of being moved along an axis 108 and a measurement unit 110 that is capable of determining a displacement of the slide 106 along the axis 108. The measurement unit 110 can be, for example, a resolver, an encoder, a laser interferometer, or any other measuring device known to the art that is suitable for measuring the displacement of the slide. In the illustrated embodiment, the measurement unit 110 includes a laser head 112 that is capable of projecting a light beam and receiving a reflected light beam. While these two beams propagate along separate paths that are substantially parallel and proximate to one another, representations of the beams are shown as a single broken line 114. The measurement unit 110 in the illustrated embodiment further includes a retroreflector 116 that is fixed (e.g., attached with screws) to the slide 106. The retroreflector 116 is capable of receiving the light beam projected from the laser head 112 and is capable of producing a reflected light beam that can be received by the laser head 112. The term "substantially parallel" means that no statistically significant measurement error exists resulting from a lack of parallelism between the elements being described.

In one embodiment, at least a portion of the light beam projected from the laser head 112 and at least a portion of the light beam projected through the interferometer 118 and reflected by the retroreflector 116 propagate along paths that are substantially parallel to the axis 108. In this situation, no statistically significant measurement error exists that results from a lack of parallelism between the portion of the light beam and the axis 108. In a situation wherein the laser head 112 is positioned so that the light projected therefrom, propagating through the interferometer 118, falls directly onto the retroreflector 116, the light beam projected from the laser head 112 and the light beam reflected by the retroreflector 116 each propagate along paths that are substantially parallel to the axis 108. However, in a situation where it is not advantageous to set up the laser head 112 so that the light projected therefrom, propagating through the interferometer 118, falls directly onto the retroreflector 116, the measurement unit 110 further includes a retroreflector 117, attached to the interferometer 118, so that the light beam projected from the laser head 112 passes through the interferometer 118 (by being reflected by the retroreflector 117) before being received by the retroreflector 116, and the light beam reflected by the retroreflector 116 passes through the interferometer 118 (by being reflected by the retroreflector 117) before being received by the laser head 112. Thus, in this embodiment, light beams propagating through the interferometer 118 are turned at a right angle by a combination of the interferometer 118 and the retroreflector 117.

As indicated above, the extendable portion 104 is connectible to the slide 106 and, in one embodiment, the extendable portion 104 is connectible to the slide 106 via a wire 120, wherein the wire 120 is connected to the extendable portion 104 and is attached to the slide 106. The extendable portion 104 being "connectible to" the slide 106 encompasses either the extendable portion 104 being connectible to the slide 106 or the slide 106 being connectible to the extendable portion 104. In one embodiment, the wire 120 is attached to the slide 106 by a clamp 122. The wire 120 extends along a path that is substantially parallel to the axis 108 and is extendable and retractable along that path. One embodiment of the present invention further comprises a reel 124 that is capable of taking-up and paying-out the wire 120 and is capable of maintaining a tension on the wire 120.

For example, the slide 106 is moved to a reference position, the wire 120 is clamped to the slide 106, and the slide 106 is then moved according to a particular desired displacement of the extendable portion 104. The slide 106 can be moved by rotating the reel 124 and thus taking-up or paying-out the wire 120 or by moving the slide 106 by hand; however, any suitable way known in the art for moving the slide 106 is within the scope of the present invention. After making a measurement, the wire 120 is then unclamped with the reel 124 keeping a tension on the wire 120 so that the extendable portion 104 remains at the same displacement. The slide 106 is then moved back to the reference position and the wire 120 reclamped to the slide 106. This process is repeated until the desired displacement of the displacement transducer 102 has been tested.

Another embodiment of the present invention includes an alignment pulley 125 that is capable of aligning the wire 120 along a path that is substantially parallel to the axis 108. In one embodiment, the alignment pulley 125 is disposed between the displacement transducer 102 and the reel 124.

It is advantageous for the wire 120, the movement of the slide 106, and the light beams of the measurement unit 110 to be aligned along paths that are parallel to the axis 108, since such an arrangement simplifies the calculation of displacement values for the transducer. That is, if these elements are arranged as described, a displacement of the extendable portion 104 equal to 100 mm, effected by a movement of the slide 106, can be directly measured by the measurement unit 110 as 100 mm. If these elements are not arranged as described, trigonometric calculations must be made to compensate for cosine errors resulting from elements operating off-axis. For example, if the slide 106 moves along an axis that is skewed from the axis 108 while the light beams of the measurement unit 110 are parallel with the axis 108, a displacement of the extendable portion 104, resulting from a movement of the slide 106, might actually be equal to 98 mm, but the measurement unit 110 might measure the displacement as being 100 mm. Thus, a cosine error correction can be calculated:

$$E = D_{meas} - (D_{meas} \cos\theta)$$

wherein:
  E=cosine error;
  $D_{meas}$=the measured displacement; and
  θ=the angle between the misaligned axes.

Figure 3:
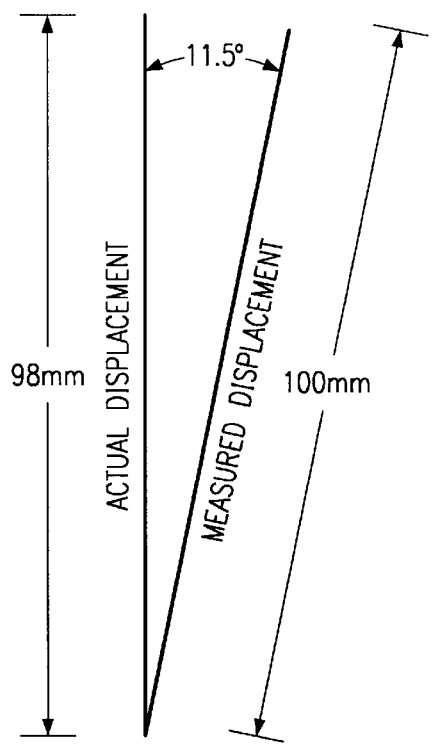
FIG. 3 is a diagram illustrating a cosine error.

Thus, in this example, a misalignment angle of 11.5° results in an error of 2 mm, as illustrated in FIG. 3:

$$E = D_{meas} - (D_{meas} \cos\theta)$$

$$E = 98 \text{ mm} - (98 \text{ mm} \cdot \cos(11.5^-))$$

$$E = 2 \text{ mm}$$

The correction to the measured displacement can be made manually by subtracting, in this case, 2 mm from the measured displacement. Further, the error calculation can be used in an error correction unit that automatically corrects for cosine errors in each displacement measurement. For example, the correction can be made to the measured output of the displacement transducer, the measured displacement, or the displacement error.

In certain applications, it may be desirable to be able to move the slide 106 a small, precise distance along the axis 108. Accordingly, one embodiment of the present invention provides an adjustment mechanism 126 that is capable of moving the slide 106 an incremental amount along the axis 108, either in conjunction with the reel 124 or without the reel 124. The adjustment mechanism 126 comprises a block 127 and a threaded portion 128 threadably engaged with the block 127. On one end of the threaded portion 128 is a thumbwheel 129 for assisting in turning the threaded portion 128. On the other end of the threaded portion 128 is a pad 130. When the thumbwheel 129 is turned in one direction (clockwise, for example), the threaded portion 128 advances through the block 127 and, when the pad 130 contacts the slide 106, the slide 106 is moved. When the thumbwheel 129 is turned in the other direction (counterclockwise, for example), the threaded portion 128 retracts through the block 127 such that the pad 130 moves away from the slide 106. The adjustment mechanism 126 allows fine adjustments to be made to the movement of the slide 106 along the axis 108 so that a precise displacement of the extendable portion 104 can be made.

The illustrated embodiment includes a resolving unit 131 that is capable of resolving an electrical output of the displacement transducer 102 corresponding to a displacement of the extendable portion 104. The resolving unit 131 may be any suitable resolving unit known to the art for this purpose. The displacement transducer 102 outputs an electrical signal based upon an excitation voltage applied to the displacement transducer 102 by the voltage supply 134 and the displacement of the extendable portion 104. The resolving unit 131 may be a voltmeter, a digital multimeter, a computer system, or any other device suitable for resolving the electrical output of the displacement transducer 102.

Further, the illustrated embodiment of the present invention includes a stop block 132 that is capable of preventing the slide 106 from moving along the axis 108 beyond the reference point described above. Thus, the slide 106 can be easily returned to the reference point without having to make careful measurements of the location of the slide 106 along the axis 108. However, the invention is not so limited and the stop block 132 may be omitted in alternative embodiments.

A data analysis unit 136 is included in the illustrated embodiment to determine a displacement error of the displacement transducer 102. In one implementation, the data analysis unit 136 performs a method in accordance with the current invention to determine a displacement error of the displacement transducer 102. The method is discussed further relative to FIG. 3. The error can be determined according to a statistical model, for example, a best-fitting curve model, a least square curve model, a least square linear model, or a least square linear regression model. While FIGS. 1 and 2 illustrate the data analysis unit 136 being directly connected with the displacement transducer 102, it can be connected with the resolving unit 131 in alternative implementations.

The illustrated embodiment further includes a base 138 having at least one linear guide rail 140. While the discussion herein presents one linear guide rail 140, there may be any number of linear guide rails 140 included in the present invention as may be determined suitable. The slide 106 is mounted to the linear guide rail 140 and is capable of reciprocating on the linear guide rail 140 so that, when the extendable portion 104 is connect to the slide 106 and the slide 106 is moved, the extendable portion 104 is extended and retracted along a path substantially parallel to the linear guide rail 140. The measurement unit 110, in one embodiment, is capable of determining a displacement of the slide 106 along the linear guide rail 140. In one embodiment, at least a portion of the light beam emitted by the laser head 112 and at least a portion of the reflected light beam (reflected by the retroreflector 116) propagate along paths that are substantially parallel to the linear guide rail 140. In another embodiment of the present invention, the wire 120 extends along a path that is substantially parallel to the linear guide rail 140. One embodiment further includes an alignment pulley 125 that is capable of aligning the wire 120 along a path that is substantially parallel to the linear guide rail 140. An adjustment mechanism 126 is provided in one embodiment to move the slide 106 an incremental amount along the linear guide rail 140. The apparatus of the present invention further includes, in one embodiment, a stand capable of holding the displacement transducer 102. In a further embodiment, the stand is mounted to the linear guide rail 140. A stop block 132 can be provided to prevent the slide 106 from being moved along the linear guide rail 140 beyond a reference point and the stop block 132 can be mounted to the linear guide rail 140. A post can be provided on which to mount the right-angle reflector 118 and the post can be mounted to the linear guide rail 140.

As can be seen from the various embodiments presented, it is within the scope of the invention that the linear guide rail 140 be parallel to the axis 108.

Figure 4:
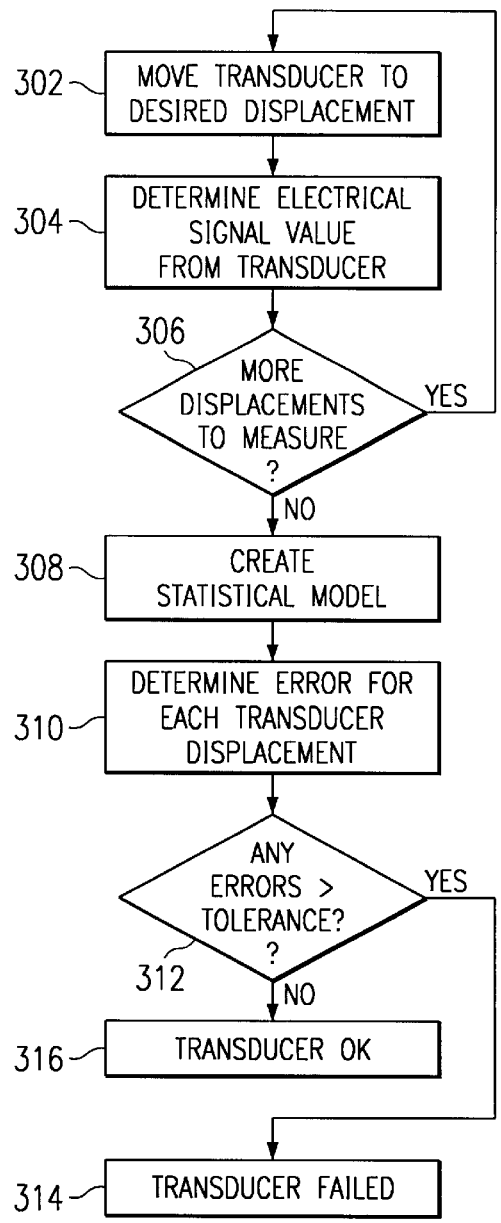
FIG. 4 is a flowchart of a method according to the present invention.

Referring now to FIG. 4, a method capable of testing a displacement transducer 102 is illustrated including moving the transducer to a desired displacement (block 302) and determining an electrical signal value from the transducer (block 304). The operations illustrated in blocks 302 and 304 are repeated a plurality of times so that the entire displacement of the transducer, or a desired portion thereof, can be tested. Thus, if more displacements are to be measured (block 306), then the transducer is moved to a new desired displacement (block 302) and the process is repeated. If no further displacements are to be measured (block 306), a statistical model is created (block 308) that represents the data taken. This model can take many forms, for example, the model can be a best-fitting curve model, a least square curve model, a least square linear model, or a least square linear regression model.

Based upon the model chosen, an error is determined for each displacement position (block 310) and each error is compared to a predetermined tolerance (block 312). If an error exceeds the tolerance, the transducer fails the test (block 314). Alternatively, if a secondary tolerance is established, the transducer fails the test if more than a predetermined number of errors exceed the predetermined tolerance. But if no error exceeds the tolerance, or if fewer than the predetermined number of errors exceed the predetermined tolerance (as described above) the transducer passes the test.

The following data represent the testing of a Rayelco™ model PV-750A position/velocity transducer according to the present invention. The transducer is a draw-wire transducer having an extendable portion that can be extended up to approximately 19 meters. The transducer has a specification accuracy of +/−0.1% of full scale; thus, the specification accuracy of this particular transducer is +/−19.05 mm. Accordingly, the tolerance for each of the displacements to be measured is +/−19.05 mm. The excitation voltage applied to the transducer during the test was 9.9946 Vdc.

To begin the test, the wire 120 was attached to the extendable portion 104 and the slide 106 was moved into contact with the stop block 132. The wire 120 was then clamped to the slide 106. For the first 1219 mm of displacement, the transducer was tested at 304.8 mm intervals, moving the slide 106 an amount corresponding to each desired displacement interval and reading the displacement measurement from the laser head 112. At that point, the wire was unclamped from the slide and the slide was returned to the reference position against the stop block 132. The wire 120 was reclamped to the slide 106 and the slide was moved 1219.2 mm. The transducer was tested at this displacement and the process repeated until the full extension (18288 mm) was reached. Table 1 provides the measured data, the calculated displacement (based upon the transducer output), and the calculated error of each data point measured. The calculated displacement and, thus, the calculated error were determined using a least square linear regression model.

Thus, as no error exceeded the predetermined tolerance of +/−19.05 mm, the transducer passed the test.

The present invention also encompasses a computer-readable program-storage device encoded with instructions that, when executed by a computer, performs some portions of the embodiments of the method of the invention described herein and their equivalents. The present invention further encompasses an apparatus having means for performing some portions of the embodiments of the method of the invention described herein and their equivalents.

TABLE 1

| Nominal Cable Displacement (mm) | Laser Displacement Data (mm) | Transducer Output (x) (Vdc) | Transducer Output (x) (mV/Vdc excitation) | Measured Displacement (y) (mm) | Calculated Displacement (mm) | Calculated Error (mm) |
|---|---|---|---|---|---|---|
| 0 | 0.0000 | 0.00656 | 0.6564 | 0.0000 | 4.115 | 4.115 |
| 305 | 304.8000 | 0.16024 | 16.0327 | 304.8000 | 303.860 | −0.940 |
| 610 | 609.6000 | 0.31505 | 31.5220 | 609.6000 | 605.790 | −3.810 |
| 914 | 914.4000 | 0.47362 | 47.3876 | 914.4000 | 915.060 | 0.660 |
| 1219 | 1219.2000 | 0.63092 | 63.1261 | 1219.2000 | 1221.842 | 2.642 |
| 2438 | 1219.2000 | 1.2573 | 125.7979 | 2438.4000 | 2431.821 | −6.579 |
| 3658 | 1219.2000 | 1.8777 | 187.8715 | 3657.6000 | 3653.536 | −4.064 |
| 4877 | 1219.2000 | 2.5036 | 250.4953 | 4876.8000 | 4874.285 | −2.515 |
| 6096 | 1219.2000 | 3.1296 | 313.1291 | 6096.0000 | 6095.213 | −0.787 |
| 7315 | 1219.2000 | 3.7578 | 375.9830 | 7315.2000 | 7320.458 | 5.258 |
| 8534 | 1219.2000 | 4.3795 | 438.1866 | 8534.4000 | 8533.003 | −1.397 |
| 9754 | 1219.2000 | 5.0065 | 500.9205 | 9753.6000 | 9755.886 | 2.286 |
| 10973 | 1219.2000 | 5.6342 | 563.7244 | 10972.8000 | 10980.141 | 7.341 |
| 12192 | 1219.2000 | 6.2577 | 626.1081 | 12192.0000 | 12196.191 | 4.191 |
| 13411 | 1219.2000 | 6.8830 | 688.6719 | 13411.2000 | 13415.772 | 4.572 |
| 14630 | 1219.2000 | 7.5059 | 750.9955 | 14630.4000 | 14630.654 | 0.254 |
| 15850 | 1219.2000 | 8.1302 | 813.4593 | 15849.6000 | 15848.279 | −1.321 |
| 17069 | 1220.1652 | 8.7552 | 875.9930 | 17069.7652 | 17067.276 | −2.489 |
| 18288 | 1219.6064 | 9.3780 | 938.3067 | 18289.3716 | 18281.955 | −7.417 |

Slope (m): 7.6745E−01 mv/Vdc excitation
Y-intercept (b): −8.6817 mm

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

Accordingly, the protection sought herein is as set forth in the claims below.

What is claimed is:

1. An apparatus capable of testing a displacement transducer having an extendable portion, the apparatus comprising:

a slide capable of being moved along an axis, the extendable portion being connectible via a wire-like member to the slide so that, when the extendable portion is connected and the slide is moved, the extendable portion is extended and retracted; and a measurement unit capable of measuring a displacement of the slide along the axis.

2. An apparatus according to claim 1, wherein the extendable portion is extended and retracted along a path substantially parallel to the axis.

3. An apparatus according to claim 2, the measurement unit further comprising:

a laser head capable of projecting a light beam and receiving a reflected light beam;

an interferometer capable of allowing the light beam to propagate therethrough; and a retroreflector fixed to the slide, the retroreflector being capable of receiving the light beam and producing the reflected light beam.

4. An apparatus according to claim 1, further comprising an adjustment mechanism capable of moving the slide an incremental amount along the axis.

5. An apparatus according to claim 1, further comprising a resolving unit capable of resolving an electrical output of the displacement transducer corresponding to a displacement of the extendable portion.

6. An apparatus according to claim 5, further comprising an error correction unit capable of correcting a cosine error in the displacement error due to nonparallelism between the axis and a path along which the extendable portion is extended and retracted.

7. An apparatus according to claim 1, further comprising a stop block capable of preventing the slide from moving along the axis beyond a reference point.

8. An apparatus according to claim 1, further comprising a power supply capable of applying an excitation voltage to the displacement transducer.

9. An apparatus according to claim 1, further comprising a data analysis unit capable of determining a displacement error of the displacement transducer.

10. An apparatus according to claim 9, further comprising an error correction unit capable of correcting a cosine error in the displacement error due to nonparallelism between the axis and a path along which the extendable portion is extended and retracted.

11. An apparatus according to claim 9, wherein the data analysis unit determines the displacement error according to a statistical model.

12. An apparatus according to claim 11, wherein the statistical model is a least square linear regression model.

13. An apparatus according to claim 1, further comprising an error correction unit capable of correcting a cosine error in the measured displacement due to nonparallelism between the axis and a path along which the extendable portion is extended and retracted.

14. An apparatus capable of testing a displacement transducer having an extendable portion, the apparatus comprising:
   a slide capable of being moved along an axis, the extendable portion being connectible via a wire to the slide so that, when the extendable portion is connected and the slide is moved, the extendable portion is extended and retracted; and
   a measurement unit capable of measuring a displacement of the slide along the axis.

15. An apparatus according to claim 14, wherein the wire extends along a path that is substantially parallel to the axis when connected to the extendible portion and attached to the slide.

16. An apparatus according to claim 15, further comprising a reel capable of taking-up and paying-out the wire.

17. An apparatus according to claim 15, further comprising an alignment pulley capable of aligning the wire along the path.

18. An apparatus according capable of testing a displacement transducer having an extendable portion, the apparatus comprising:
   a slide capable of being reciprocated along an axis, the extendable portion being connectible to the slide so that, when the extendable portion is connected and the slide is reciprocated, the extendable portion is extended and retracted along a path that is substantially parallel to the axis;
   a measurement unit capable of measuring a displacement of the slide along the axis;
   a laser head capable of projecting a light beam and receiving a reflected light beam;
   an interferometer capable of allowing the light beam to propagate therethrough;
   a first retroreflector fixed to the slide, the first retroreflector being capable of receiving the light beam and producing the reflected light beam, such that at least a portion of the light beam and at least a portion of the reflected light beam propagate along paths that are substantially parallel to the axis; and
   a second retroreflector,
   wherein the projected light beam from the laser head is reflected by the second retroreflector before being received by the first retroreflector and the reflected light beam is reflected by the second retroreflector before being received by the laser head.

19. An apparatus capable of testing a displacement transducer having an extendable portion, the apparatus comprising:
   a base having at least one linear guide rail;
   a slide mounted to the at least one linear guide rail and capable of reciprocating along the at least one linear guide rail, the extendable portion being connectible to the slide so that, when the extendable portion is connected and the slide is reciprocated, the extendable portion is extended and retracted along a path;
   a measurement unit capable of determining a displacement of the slide along the at least one linear guide rail; and
   a stand capable of holding the displacement transducer, the stand being mounted to the at least one linear guide rail.

20. An apparatus according to claim 19, wherein the path is substantially parallel to the at least one linear guide rail.

21. An apparatus according to claim 20, the measurement unit further comprising:
   a laser head capable of projecting a light beam and capable of receiving a reflected light beam;
   an interferometer capable of allowing the light beam to propagate therethrough; and
   a retroreflector fixed to the slide, the retroreflector being capable of receiving the light beam and producing the reflected light beam.

22. An apparatus according to claim 19, further comprising an adjustment mechanism capable of moving the slide an incremental amount along the at least one linear guide rail.

23. An apparatus according to claim 19, further comprising a resolving unit capable of resolving an electrical output of the displacement transducer corresponding to a displacement of the extendable portion.

24. An apparatus according to claim 23, further comprising an error correction unit capable of correcting a cosine error in the displacement error due to nonparallelism between the axis and the path.

25. An apparatus according to claim 19, further comprising a stop block capable of preventing the slide from being moved along the at least one linear guide rail beyond a reference position, the stop block being mounted to the at least one linear guide rail.

26. An apparatus, according to claim 19, further comprising a power supply capable of applying an excitation voltage to the displacement transducer.

27. An apparatus according to claim 19, further comprising a data analysis unit capable of determining a displacement error of the displacement transducer.

28. An apparatus according to claim 27, further comprising an error correction unit capable of correcting a cosine error in the displacement error due to nonparallelism between the axis and the path.

29. An apparatus according to claim 27, wherein the data analysis unit determines the displacement error according to a statistical model.

30. An apparatus according to claim 29, wherein the statistical model is a least square linear regression model.

31. An apparatus according to claim 19, further comprising an error correction unit capable of correcting a cosine error in the displacement error due to nonparallelism between the axis and the path.

32. An apparatus capable of testing a displacement transducer having an extendable portion, the apparatus comprising:
   a base having at least one linear guide rail;
   a slide mounted to the at least one linear guide rail and capable of reciprocating along the at least one linear guide rail, the extendable portion being connectible to the slide via a wire so that, when the extendable portion is connected and the slide is reciprocated, the extendable portion is extended and retracted along a path; and
   a measurement unit capable of determining a displacement of the slide along the at least one linear guide rail.

33. An apparatus according to claim 32, wherein the wire extends along a path that is substantially parallel to the at least one linear guide rail when connected to the extendable portion and attached to the slide.

34. An apparatus according to claim 33, further comprising a reel capable of taking-up and paying-out the wire, the reel being mounted to the at least one linear guide rail.

35. An apparatus according to claim 34, further comprising an alignment pulley capable of aligning the wire along the path.

36. An apparatus for testing a transducer having an extendable portion, the apparatus comprising:
   a slide capable of being moved along an axis;
   pliable means for connecting the extendable portion to the slide such that the extendable portion may be extended and retracted as the slide is moved; and
   a measurement unit capable of measuring a displacement of the slide along the axis.

37. An apparatus, according to claim 36, wherein the pliable means for connecting the extendable portion to the slide comprises a wire-like member.

38. An apparatus, according to claim 36, wherein the pliable means for connecting the extendable portion to the slide comprises a strand.

39. An apparatus, according to claim 36, wherein the pliable means for connecting the extendable portion to the slide comprises a rod.

40. An apparatus, according to claim 36, wherein the pliable means for connecting the extendable portion to the slide comprises a bundle of strands.

41. An apparatus, according to claim 36, wherein the pliable means for connecting the extendable portion to the slide comprises a group of strands twisted together.

42. An apparatus, according to claim 36, wherein the pliable means for connecting the extendable portion to the slide comprises a cable.

43. An apparatus capable of testing a displacement transducer having an extendable portion, the apparatus comprising:
   a slide capable of being moved along an axis, the extendable portion being connectible to the slide such that, when the extendable portion is connected and the slide is moved, the extendable portion may be extended and retracted;
   means for retaining the extendable portion at a desired displacement when the extendable portion is disconnected from the slide; and
   a measurement unit capable of measuring a displacement of the slide along the axis.

44. An apparatus, according to claim 43, wherein the means for retaining the extendable portion further comprises a wire-like member and a reel capable of taking-up and paying-out the wire-like member.

45. An apparatus, according to claim 44, wherein the wire-like member further comprises one of a wire, a strand, a rod, a bundle of strands, a group of strands twisted together, and a cable.

* * * * *